(12) United States Patent (10) Patent No.: US 12,618,427 B2
Barbon (45) Date of Patent: May 5, 2026

(54) POLE ADAPTER AND RELATED HAND TOOLS USING THE ADAPTER

(71) Applicant: Behr Process Corporation, Santa Ana, CA (US)

(72) Inventor: Mitch Barbon, Irvine, CA (US)

(73) Assignee: Behr Process Corporation, Santa Ana, CA (US)

( * ) Notice: Subject to any disclaimer, the term of this patent is extended or adjusted under 35 U.S.C. 154(b) by 232 days.

(21) Appl. No.: 18/678,192

(22) Filed: May 30, 2024

(65) Prior Publication Data

US 2025/0369473 A1 Dec. 4, 2025

(51) Int. Cl.
| | |
|---|---|
| *F16B 7/18* | (2006.01) |
| *B05C 17/02* | (2006.01) |
| *B25G 3/12* | (2006.01) |
| *F16B 7/04* | (2006.01) |
| *F16B 7/22* | (2006.01) |

(52) U.S. Cl.
CPC .......... *F16B 7/182* (2013.01); *B05C 17/0205* (2013.01); *B25G 3/12* (2013.01); *F16B 7/042* (2013.01); *F16B 7/22* (2013.01); *Y10T 403/595* (2015.01)

(58) Field of Classification Search
CPC ........ F16B 7/0413; F16B 7/042; F16B 7/182; F16B 7/22; B25G 1/04; B25G 1/10; B25G 3/02; B25G 3/04; B25G 3/12; B25G 3/18; B25G 3/24; B25G 3/30;
B05C 17/02; B05C 17/0205; Y10T 403/556; Y10T 403/59; Y10T 403/591; Y10T 403/595; Y10T 403/599
See application file for complete search history.

(56) References Cited

U.S. PATENT DOCUMENTS

| | | | | |
|---|---|---|---|---|
| 4,238,164 A | * | 12/1980 | Mazzolla | F16B 7/14 403/109.5 |
| 4,364,143 A | * | 12/1982 | Uhl | B25G 1/04 15/230.11 |
| 4,524,484 A | * | 6/1985 | Graham | A45B 9/00 403/104 |
| 5,226,198 A | | 7/1993 | Martin | |
| 5,288,161 A | | 2/1994 | Graves et al. | |
| 5,385,420 A | | 1/1995 | Newman, Sr. | |

(Continued)

*Primary Examiner* — Amber R Anderson
*Assistant Examiner* — Kevin J Baynes
(74) *Attorney, Agent, or Firm* — Reising Ethington P.C.

(57) ABSTRACT

A pole adapter extends along a longitudinal axis, and includes a flange and a skirt extending axially away from the flange. The flange includes an inboard side including an adapter base surface, an outboard side having an outboard surface and a plurality of circumferentially spaced and axially inwardly extending pockets in the outboard surface and having obliquely oriented receiver facets, a radially inner portion extending axially between the outboard and inboard sides and having circumferentially spaced radially inwardly facing receiver flats, and a radially outer portion extending axially between the outboard and inboard sides. The skirt includes a radially outer portion extending away from the adapter base surface of the flange and having a radially outer surface, and a radially inner portion having a radially inner surface carrying one or more internal threads. A related system and tool handle are also disclosed.

22 Claims, 14 Drawing Sheets

(56)  References Cited

U.S. PATENT DOCUMENTS

| | | | | |
|---|---|---|---|---|
| 5,497,527 A * | 3/1996 | Jang | B05C 17/0205 | D4/122 |
| 5,579,558 A * | 12/1996 | Newman, Jr. | B05C 17/0205 | 81/177.1 |
| 5,857,241 A * | 1/1999 | Camp, Jr. | B25G 1/10 | 15/230.11 |
| 5,876,147 A * | 3/1999 | Longo | F16B 7/182 | 403/109.5 |
| 5,983,455 A * | 11/1999 | Polzin | B05C 17/0205 | 15/144.4 |
| 6,305,043 B1 * | 10/2001 | Rosnak | B05C 17/00 | 15/210.1 |
| 6,349,451 B1 * | 2/2002 | Newman | B05C 17/0205 | 16/427 |
| 6,779,235 B2 | 8/2004 | Newman et al. | | |
| 6,874,201 B2 | 4/2005 | Ta et al. | | |
| 7,413,366 B2 * | 8/2008 | Bensussan | B25G 3/26 | 403/324 |
| 7,431,342 B2 * | 10/2008 | Sauer | F16B 7/182 | 285/317 |
| 7,721,391 B2 | 5/2010 | Bukovitz et al. | | |
| 8,186,012 B2 | 5/2012 | Mann | | |
| 8,875,350 B2 | 11/2014 | Bukovitz | | |
| 8,991,012 B1 * | 3/2015 | Hilbrant | B25G 3/28 | 16/427 |
| 9,021,648 B1 * | 5/2015 | Chu | B25G 1/04 | 15/119.1 |
| 9,127,699 B2 | 9/2015 | Lambertson, Jr. et al. | | |
| 9,346,077 B2 | 5/2016 | Lambertson, Jr. et al. | | |
| 9,573,161 B2 | 2/2017 | Goodwin, Jr. et al. | | |
| D824,746 S | 8/2018 | Lambertson et al. | | |
| D849,414 S | 5/2019 | Lambertson, Jr. et al. | | |
| D882,275 S | 4/2020 | Ekström | | |
| 11,213,940 B2 | 1/2022 | Buckley et al. | | |
| 11,583,067 B2 | 2/2023 | Adkins | | |
| 2004/0168276 A1 * | 9/2004 | Lye | B05C 17/0217 | 492/19 |
| 2022/0055201 A1 | 2/2022 | Buckley et al. | | |

* cited by examiner

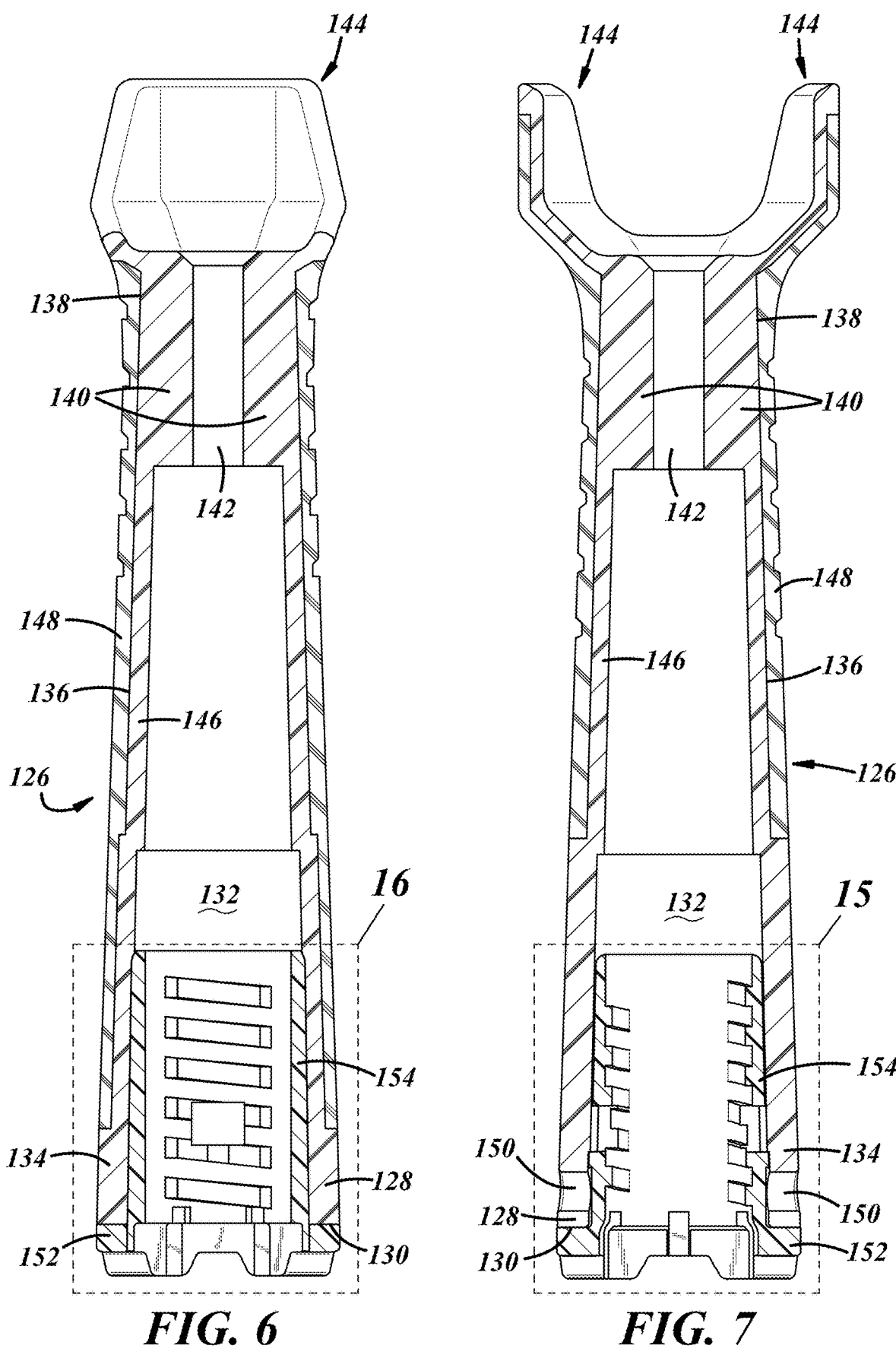
*FIG. 6*                 *FIG. 7*

320

452

320

450

452

430

POLE ADAPTER AND RELATED HAND TOOLS USING THE ADAPTER

TECHNICAL FIELD

This disclosure relates generally to couplings between poles and hand tools and, more particularly, to an adapter used to couple poles to hand tools.

BACKGROUND

Paint rollers generally include several components: a frame, a handle attached to one end of the frame, a roller carrier at the other end of the frame, and a roller cover or applicator mounted on the roller carrier. The handle typically features a coupling in the form of a threaded free end designed to accommodate a threaded extension pole.

Certain paint roller manufacturers have introduced their own extension poles with distinctive handle connectors. These handle connectors necessitate paint roller handles having specially tailored free ends to accommodate the specific extension pole connectors manufactured by each manufacturer. Unfortunately, because the connectors are mutually exclusive, this scenario often obliges consumers to pair the extension pole and the paint roller from the same manufacturer.

SUMMARY

According to an embodiment, a pole adapter extends along a longitudinal axis, and includes a flange and a skirt extending axially away from the flange. The flange includes an inboard side including an adapter base surface, an outboard side having an outboard surface and a plurality of circumferentially spaced and axially inwardly extending pockets in the outboard surface and having obliquely oriented receiver facets, a radially inner portion extending axially between the outboard and inboard sides and having circumferentially spaced radially inwardly facing receiver flats, and a radially outer portion extending axially between the outboard and inboard sides. The skirt includes a radially outer portion extending away from the adapter base surface of the flange and having a radially outer surface, and a radially inner portion having a radially inner surface carrying one or more internal threads.

According to another embodiment, a pole adapter system includes a first pole including a first locking interface including a first locking interface plug, a second pole including a second locking interface different from the first locking interface of the first pole and including a second locking interface plug, and a third pole including one or more external threads. The pole adapter system also includes an adapter including a first locking interface receiver configured for locked coupling to the first locking interface of the first pole, a second locking interface receiver configured for locked coupling to the second locking interface of the second pole, and one or more internal threads for threaded coupling to the one or more external threads of the third pole.

According to a further embodiment, a hand tool including a handle having a sidewall circumscribing a longitudinal axis, a frame end, and a free end axially oppositely disposed from the frame end and having a handle base wall with an outboard base surface and an adapter pocket in the handle base wall. The hand tool also includes a pole adapter extending along the longitudinal axis and carried in the adapter pocket of the handle. The pole adapter includes a flange including an inboard side including an adapter base surface, and an outboard side having an outboard surface and a plurality of circumferentially spaced and axially inwardly extending pockets in the outboard surface and having obliquely oriented receiver facets. The flange also includes a radially inner portion extending axially between the outboard and inboard sides and having circumferentially spaced radially inwardly facing receiver flats, and a radially outer portion extending axially between the outboard and inboard sides. The pole adapter also includes a skirt extending axially away from the flange and including a radially outer portion extending away from the adapter base surface of the flange and having a radially outer surface, and a radially inner portion having a radially inner surface carrying one or more internal threads.

BRIEF DESCRIPTION OF THE DRAWINGS

FIG. 6 is a longitudinal sectional view of the handle of the paint roller of FIG. 1, taken from line 6-6 of FIG. 4;

FIG. 7 is a longitudinal sectional view of the handle of the paint roller of FIG. 1, taken from line 7-7 of FIG. 4;

DETAILED DESCRIPTION

In general, a hand tool and related adapter will be described using one or more examples of illustrative embodiments of a paint roller that includes a handle coupled to a wire frame. However, it will be appreciated as the description proceeds that the presently disclosed hand tool and related adapter are useful in many different applications and may be implemented in many other embodiments. In this regard, and as used herein and in the claims, it will be understood that the term hand tool refers not only to paint roller applications, but also to paint brushes, squeegees, dusters, mops, sanders, scrapers, any other hand tool applications suitable for use with extension poles.

As used in herein, the terminology "for example," "e.g.," for instance," "like," "such as," "comprising," "having," "including," and the like, when used with a listing of one or more elements, is to be construed as open-ended, meaning that the listing does not exclude additional elements. As used herein, permissive terms like "may" and "can" are expedients merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Figure 1:
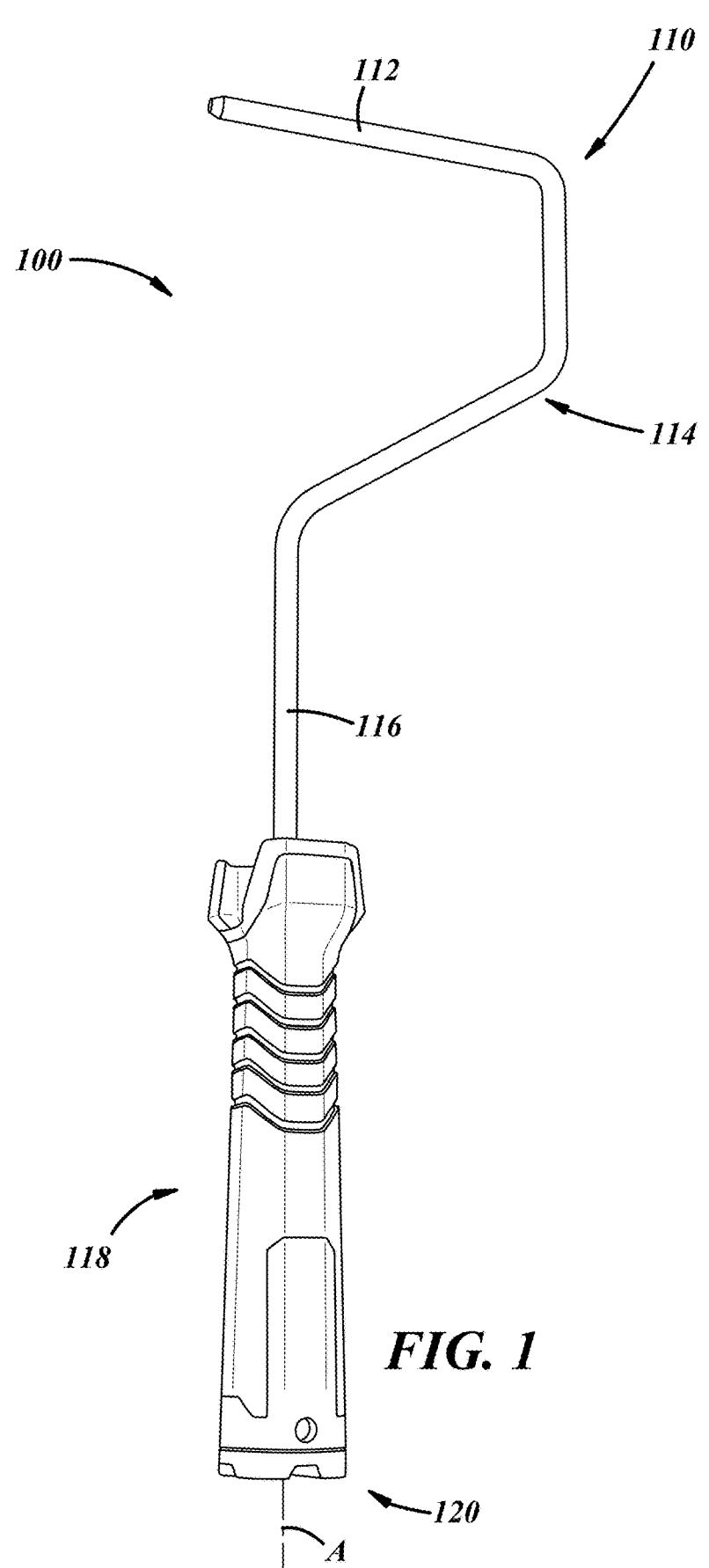
FIG. 1 is a perspective view according to a illustrative embodiment of a hand tool in the form of a portion of a paint roller including a wire frame having a free end establishing a rotational axis for a rotatable paint roller cage, and a handle having a frame end coupled to the wire frame and a free end including extension pole connection features and adapter.
Figures 2, 3:
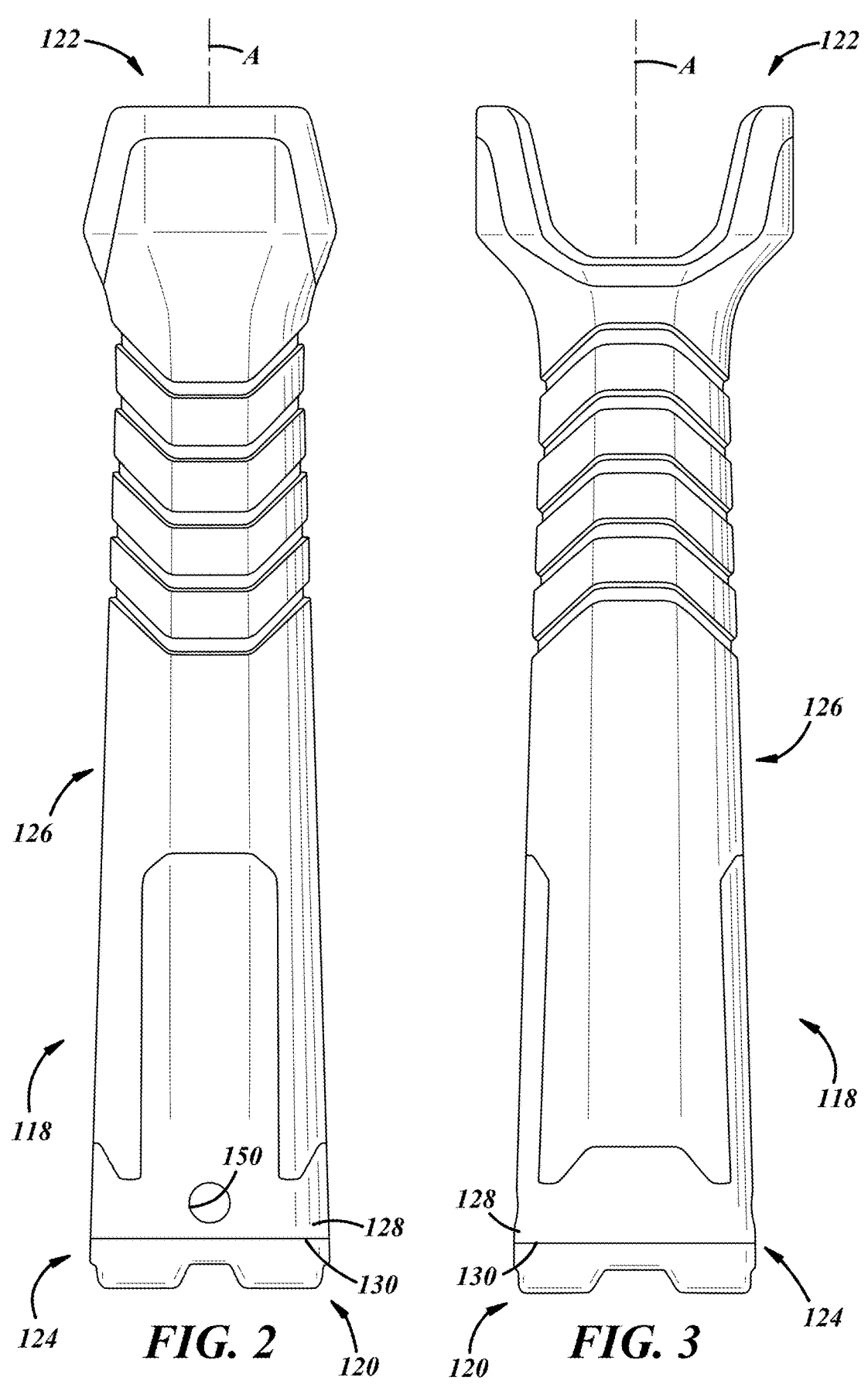
FIG. 2 is an enlarged front view of the handle of the paint roller of FIG. 1, wherein a rear view of the handle may be substantially the same as the front view.
FIG. 3 is an enlarged right side view of the handle of the paint roller of FIG. 1, wherein a left side view of the handle may be substantially the same as the right side view.
Figure 4:
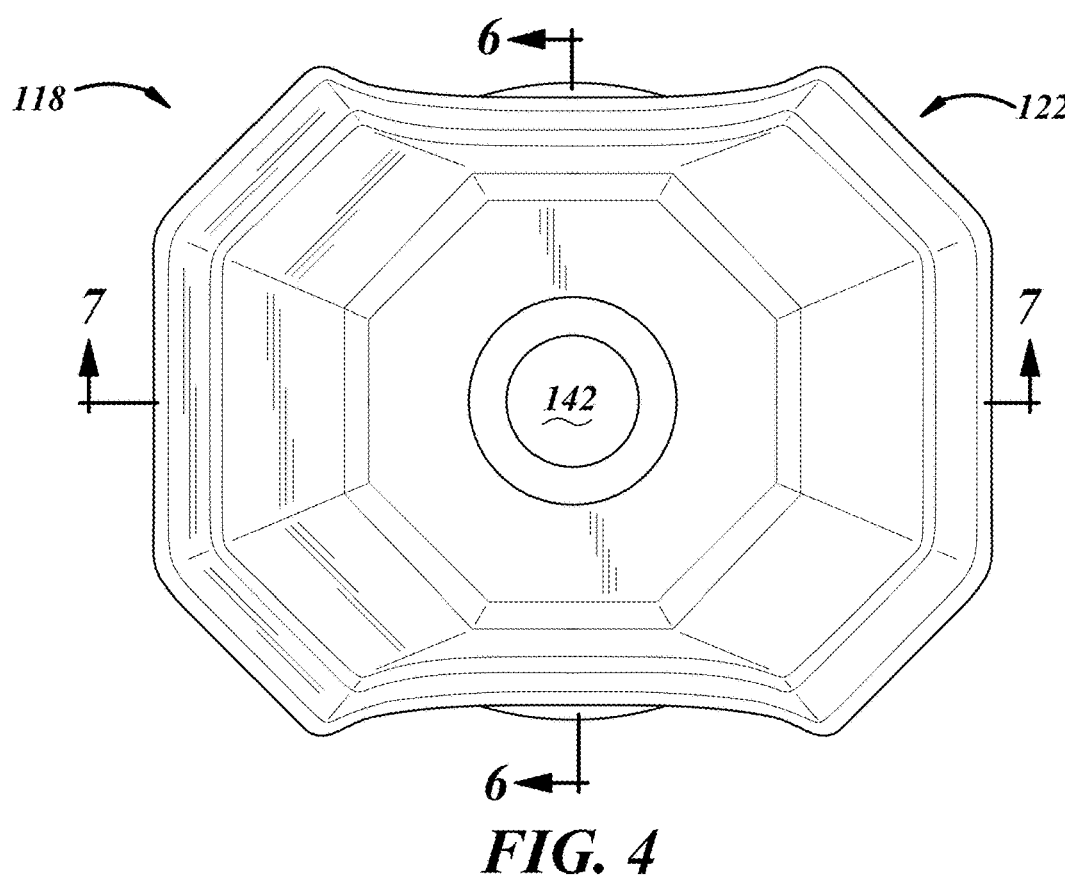
FIG. 4 is an enlarged top view of the handle of the paint roller of FIG. 1.
Figure 5:
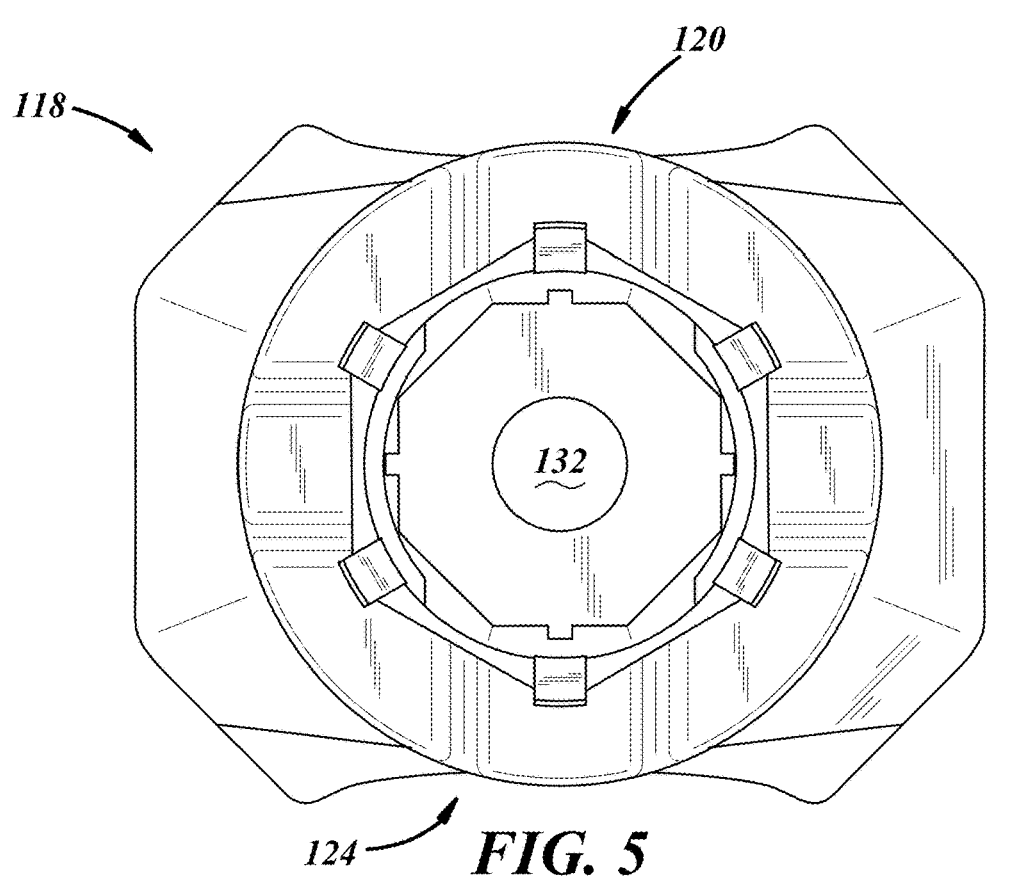
FIG. 5 is an enlarged bottom view of the handle of the paint roller of FIG. 1.
Figure 8:
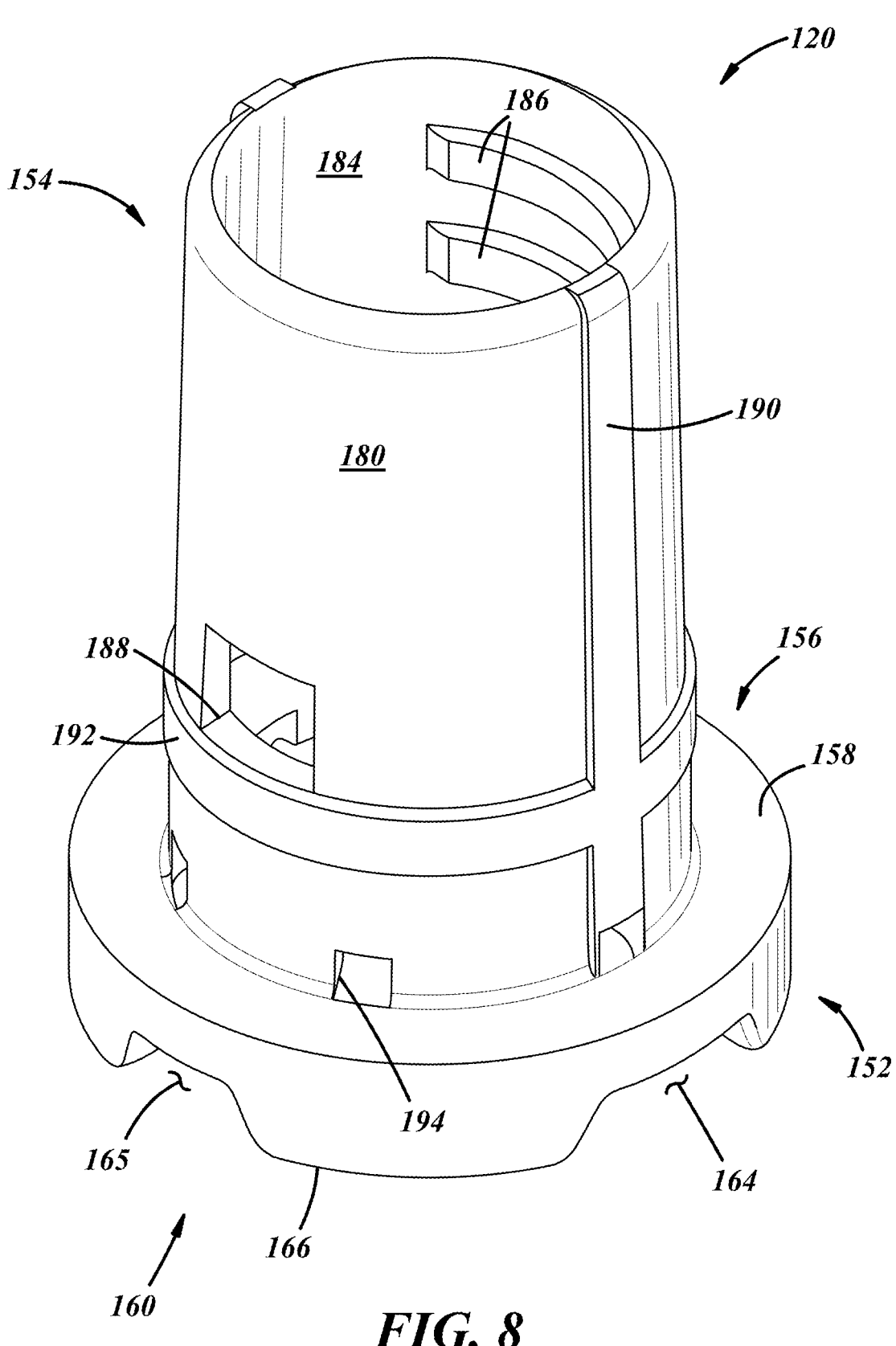
FIG. 8 is an enlarged perspective view of the pole adapter of FIG. 1.
Figure 9:
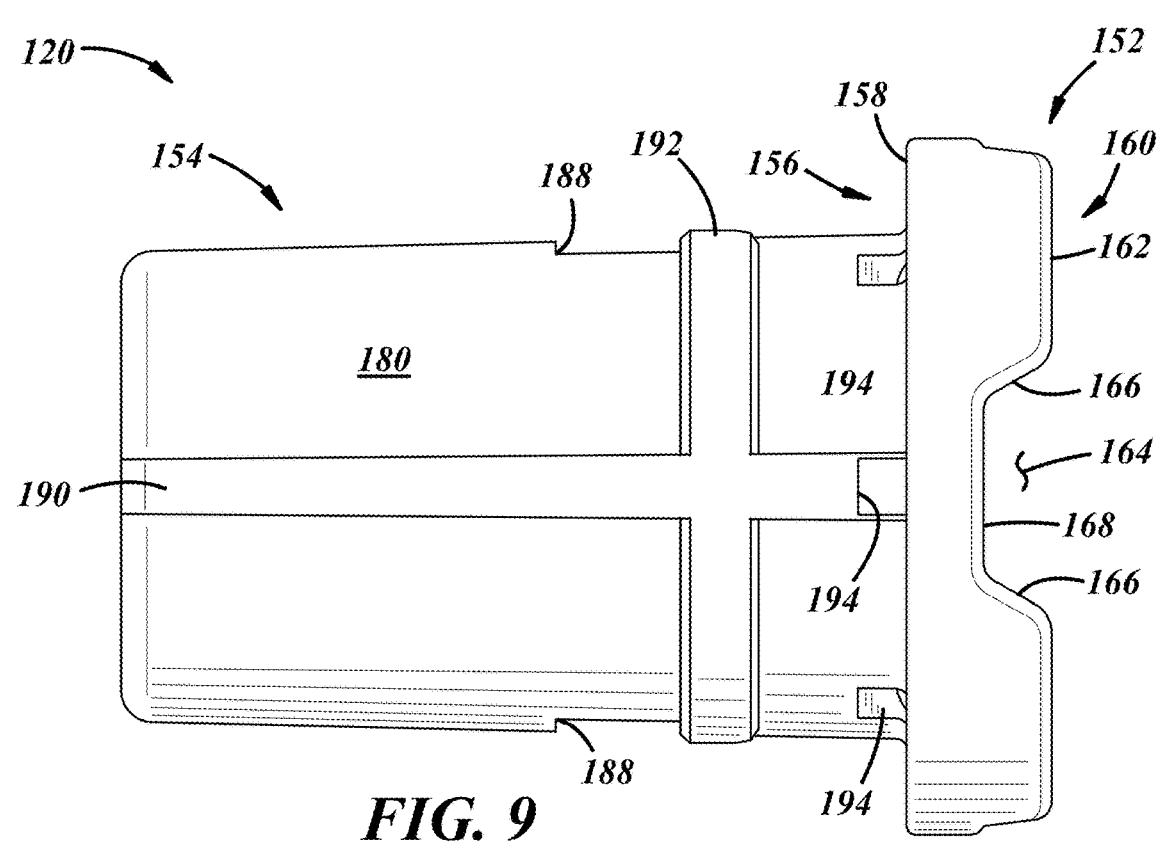
FIG. 9 is an enlarged side view of the pole adapter of FIG. 1.
Figure 10:
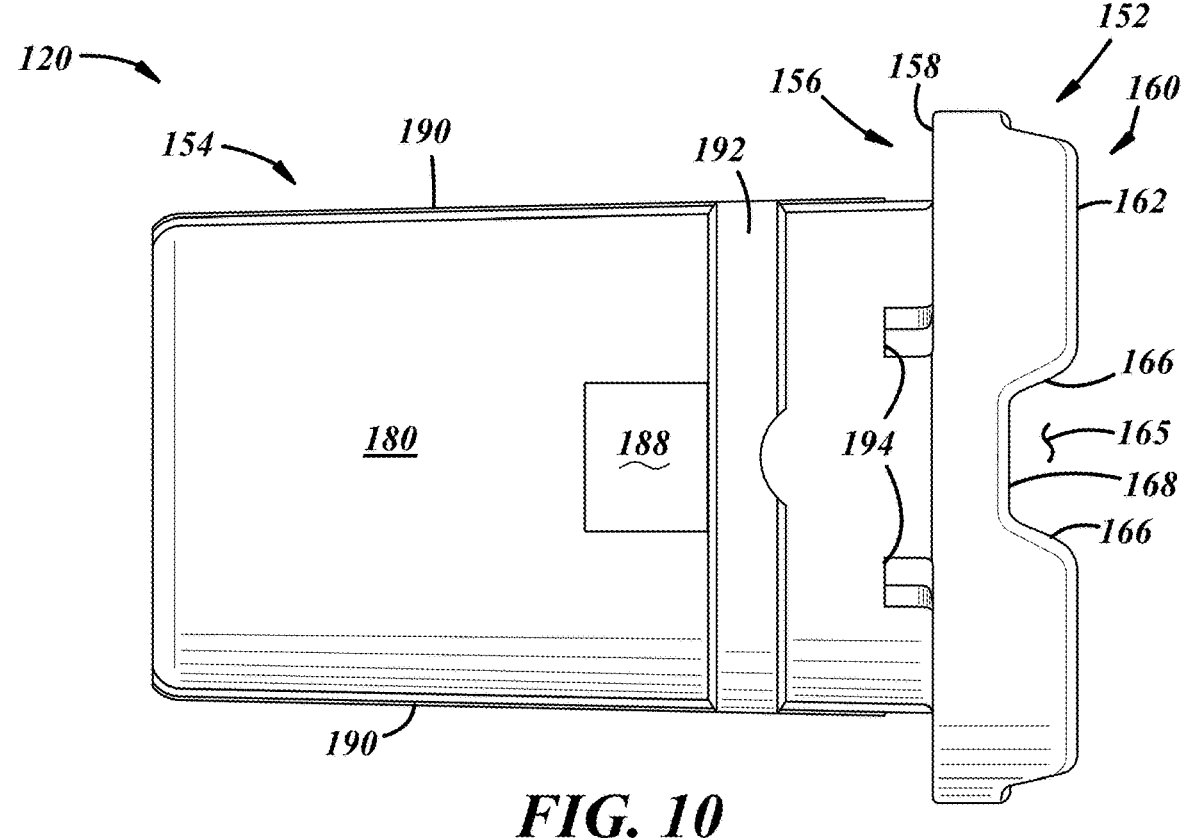
FIG. 10 is another enlarged side view of the pole adapter of FIG. 1, and rotated ninety angular degrees from the view of FIG. 9.

Referring specifically to the drawings, FIG. 1 shows an illustrative embodiment of a hand tool in the form of a fluent material roller 100, such as a paint roller, including a frame 110 having an elongated carrier shaft 112 establishing a rotational axis for a roller cover cage or cover carrier (not shown) adapted to be rotatably mounted on the carrier shaft 112. The frame 110 may include an offset shaft 114 extending away from the elongated carrier shaft 112 and terminating in a handle shaft 116. The roller 100 includes a handle 118 that may be fixed to the handle shaft 116 of the frame 110. The handle 118 is oblong, extends along a longitudinal axis A, and couples to an adapter 120. The handle 118 is configured to be gripped by a user's hand and/or to be coupled to a pole by way of the adapter 120 as will be described in detail herein below.

With reference now to FIGS. 2 through 7 generally, the handle 118 includes a frame end 122, a free end 124 axially oppositely disposed from the frame end 122, and a sidewall 126 circumscribing the longitudinal axis A and extending between the frame and free ends 122, 124. The frame end 122 may be configured to be coupled to the frame handle shaft 116 (FIG. 1) by molding, interference-fitting, fastening, or any other suitable means for coupling the handle 118 to the frame 110 (FIG. 1). Conversely, the free end 124 may be configured to be coupled to the adapter 120. For example, the free end 124 may include a handle base wall 128 with an outboard base surface 130 and an adapter pocket 132 (FIGS. 6 and 7) in the handle base wall 128 and in which the adapter 120 is carried.

With reference now to FIGS. 6 and 7, the sidewall 126 may include a free end portion 134 extending away from the handle base wall 128 and configured to support the adapter 120, an intermediate portion 136 extending away from the free end portion 134 and that may be configured to support a user's hand grip, and a frame end portion 138 extending away from the intermediate portion 136 and configured to be coupled to the frame 110. The frame end portion 138 may include a frame coupling portion 140 that may be thicker than the sidewall 126 at the intermediate portion 136 and having a frame or handle shaft passage 142 extending therethrough and open to a hollow interior of the intermediate portion 136 and the free end portion 134. The frame end portion 138 also may include hooks or projections 144 extending away from the frame coupling portion 140. The handle 118 may be composed of a relatively rigid substrate portion 146 and a relatively flexible grip-enhancing cover portion 148 that may be overmolded, co-molded, or applied in any other way to the substrate portion 146. The grip-enhancing cover portion 148 may be composed of any suitable elastomeric material and may extend from the free end portion 134 to the frame end portion 138 along the substrate portion 146, which may be composed of any suitable polymeric material. The free end portion 134 may include the adapter pocket 132, and one or more transverse reliefs 150 extending therethrough and axially spaced from the handle base wall 128. The transverse reliefs 150 may be holes, apertures, depressions, or any other suitable reliefs configured to accept an engagement or locking member of a particular type of pole. The adapter pocket 132 may be generally cylindrical but tapered to correspond to the adapter 120.

With reference now to FIGS. 8 through 14 generally, the adapter 120 includes a flange 152 and a skirt 154 that extends axially away from the flange 152 and that may be cylindrical. The flange 152 includes an inboard side 156 having an adapter base surface 158 and an outboard side 160 having an outboard surface 162. The outboard side 160 also includes a plurality of circumferentially spaced and axially inwardly extending pockets 164, 165 in the outboard surface 162 and having obliquely oriented receiver facets 166 and root surfaces 168 extending therebetween. One set of the pockets 164 may be relatively circumferentially wider than the other set of pockets 165, as illustrated.

Figures 11, 12:
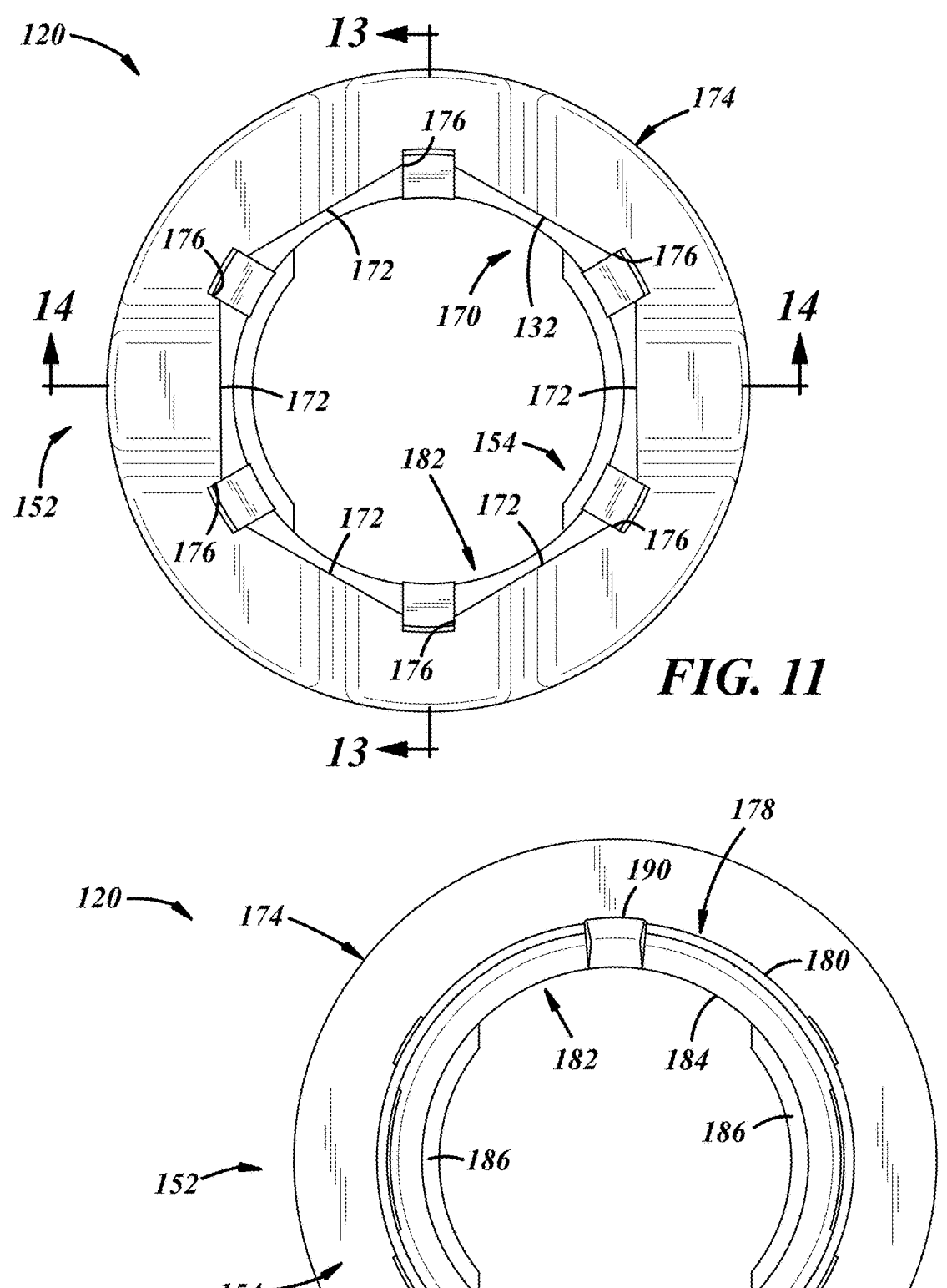
FIG. 11 is an enlarged bottom view of the pole adapter of FIG. 1.
FIG. 12 is an enlarged top view of the pole adapter of FIG. 1.
Figure 13:
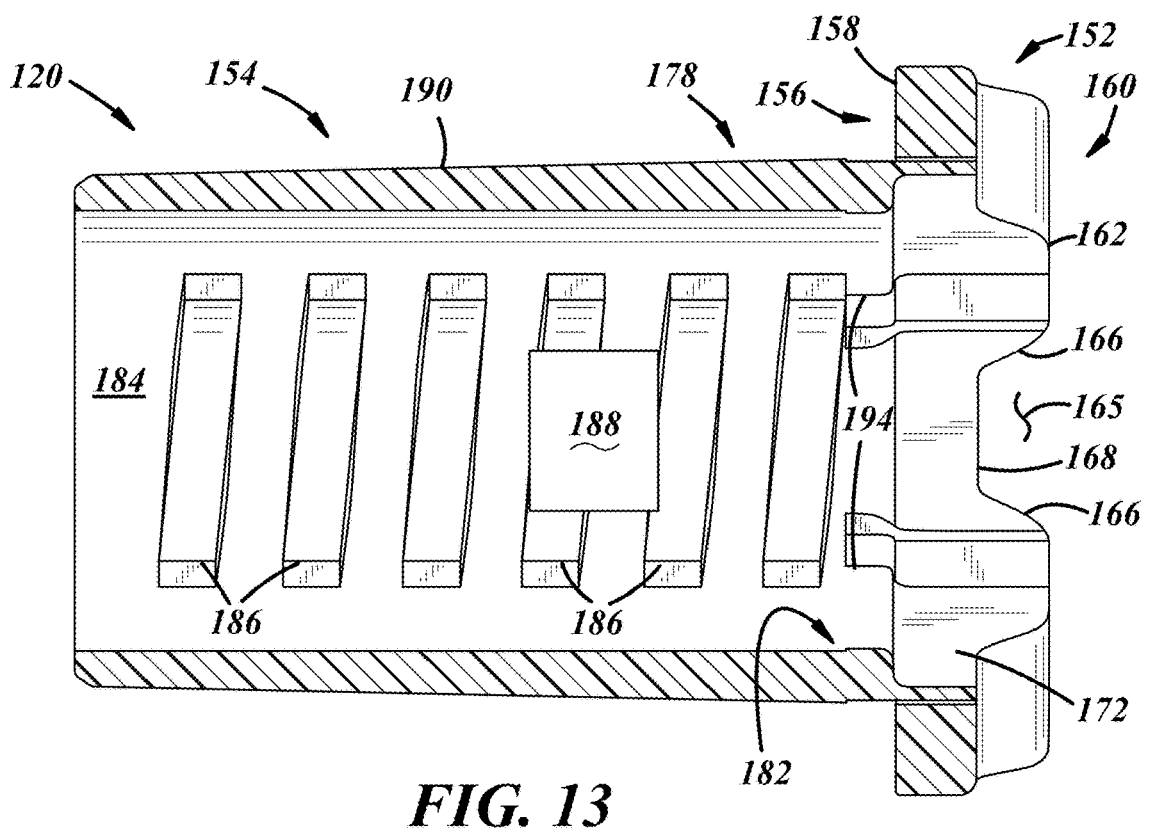
FIG. 13 is an enlarged longitudinal sectional view of the pole adapter of FIG. 1, taken from line 13-13 of FIG. 11.
Figure 14:
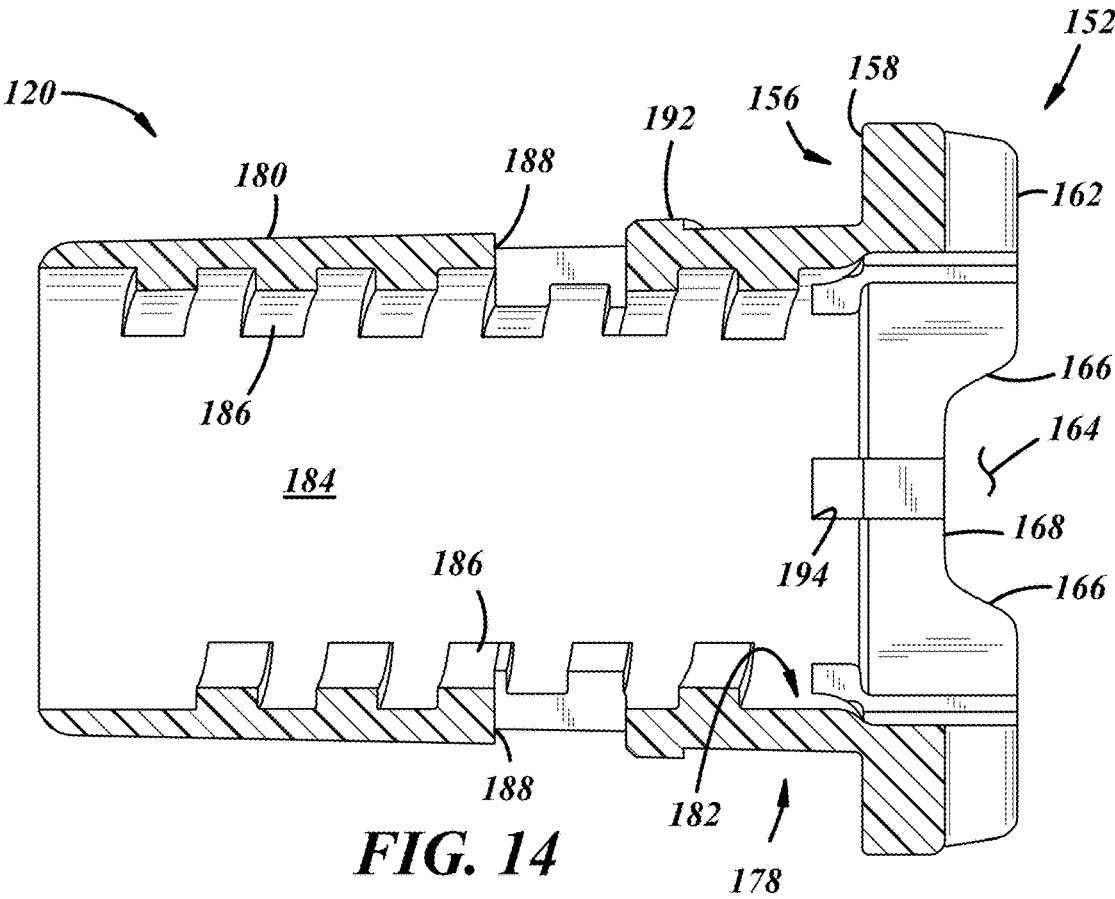
FIG. 14 is an enlarged longitudinal sectional view of the pole adapter of FIG. 1, taken from line 14-14 of FIG. 11.

As best shown in FIGS. 11, 13, and 14, the flange 152 also includes a radially inner portion 170 extending axially between the inboard and outboard sides 156, 160 and having receiver flats 172 that are circumferentially spaced and radially inwardly facing, and a radially outer portion 174 extending axially between the outboard and inboard sides and that may be a surface of cylindrical shape. The flange 152 further includes circumferentially spaced cutouts 176 between the receiver flats 172 in place of apexes between the receiver flats 172.

The skirt 154 includes a radially outer portion 178 extending away from the adapter base surface 158 of the flange 152 and having a radially outer surface 180, a radially inner portion 182 having a radially inner surface 184 carrying one or more internal threads 186, and one or more transverse reliefs 188 (FIG. 13) that extend transversely through the skirt 154 and may intersect and interrupt the internal threads 186. The transverse reliefs 188 may be may be holes, apertures, depressions, or any other suitable reliefs configured to accept an engagement or locking member of a particular type of pole. The radially outer portion 178 may be of tapered cylindrical shape such that it may not be a right cylinder. The radially outer portion 178 of the skirt 154 also includes axially extending ribs 190 projecting radially outwardly from the radially outer surface 180 and that may be tapered radially inwardly extending in a direction away from the adapter base surface 158. The radially outer portion 178 of the skirt 154 also includes a circumferentially extending rib 192 projecting radially outwardly from the radially outer surface 180 and that may be located proximate the base surface 158. The skirt 154 includes a plurality of transversely extending apertures 194 at an intersection of the base surface 158 and the skirt 154. The apertures 194 may intersect and be in open communication with the cutouts 176 of the flange 152. A diametric distance between opposed instances of the radially inwardly facing receiver flats 172 of the flange 152 may be greater than an inside diameter of the radially inner portion 182 of the skirt 154.

Figure 15:
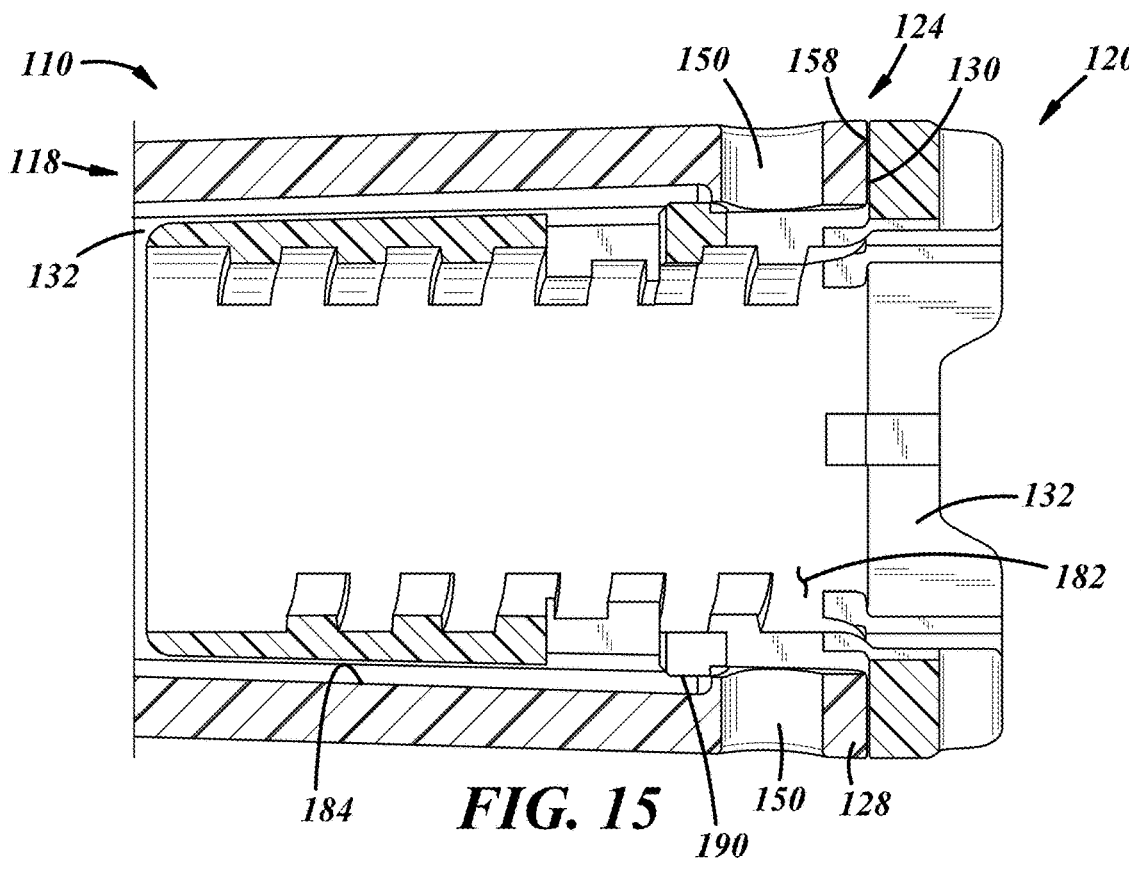
FIG. 15 is an enlarged longitudinal sectional view of a lower portion of the handle of the paint roller of FIG. 1, taken from box 15 of FIG. 7.
Figure 16:
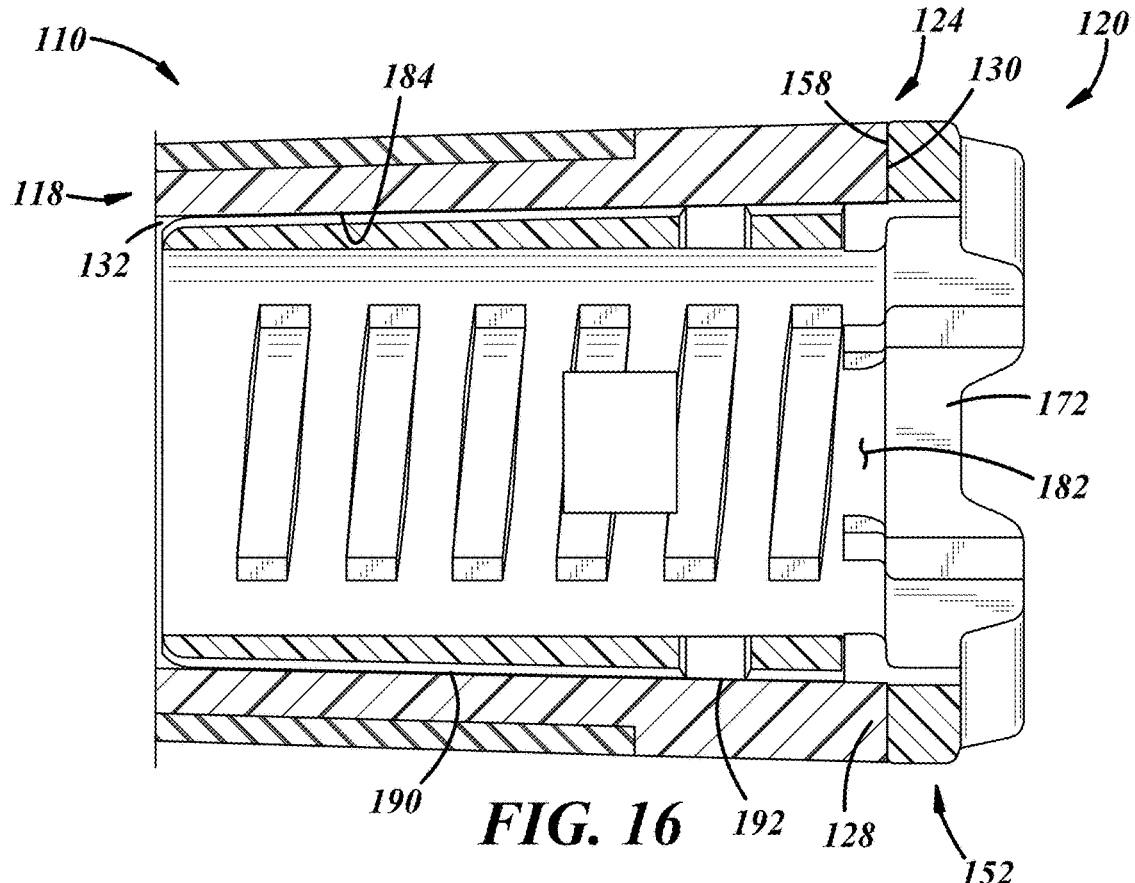
FIG. 16 is an enlarged longitudinal sectional view of a lower portion of the handle of the paint roller of FIG. 1, taken from box 16 of FIG. 6.

With reference now to FIGS. 15 and 16, the adapter 120 may be inserted into the adapter pocket 132 in the free end 124 of the handle 118 so that the adapter base surface 158 of the flange 152 locates against the outboard base surface 130 of the handle base wall 128. For example, the adapter 120 may be interference fit into the adapter pocket 132 of the free end 124 of the handle 118 wherein the ribs 190, 192 of the adapter 120 may fit into corresponding reliefs (not separately shown) in the radially inner surface 184 of the handle 118 to resist relative rotation of the adapter 120 relative to the handle 118 and to resist pull-out of the adapter 120 relative to the handle 118.

Figures 17, 18:
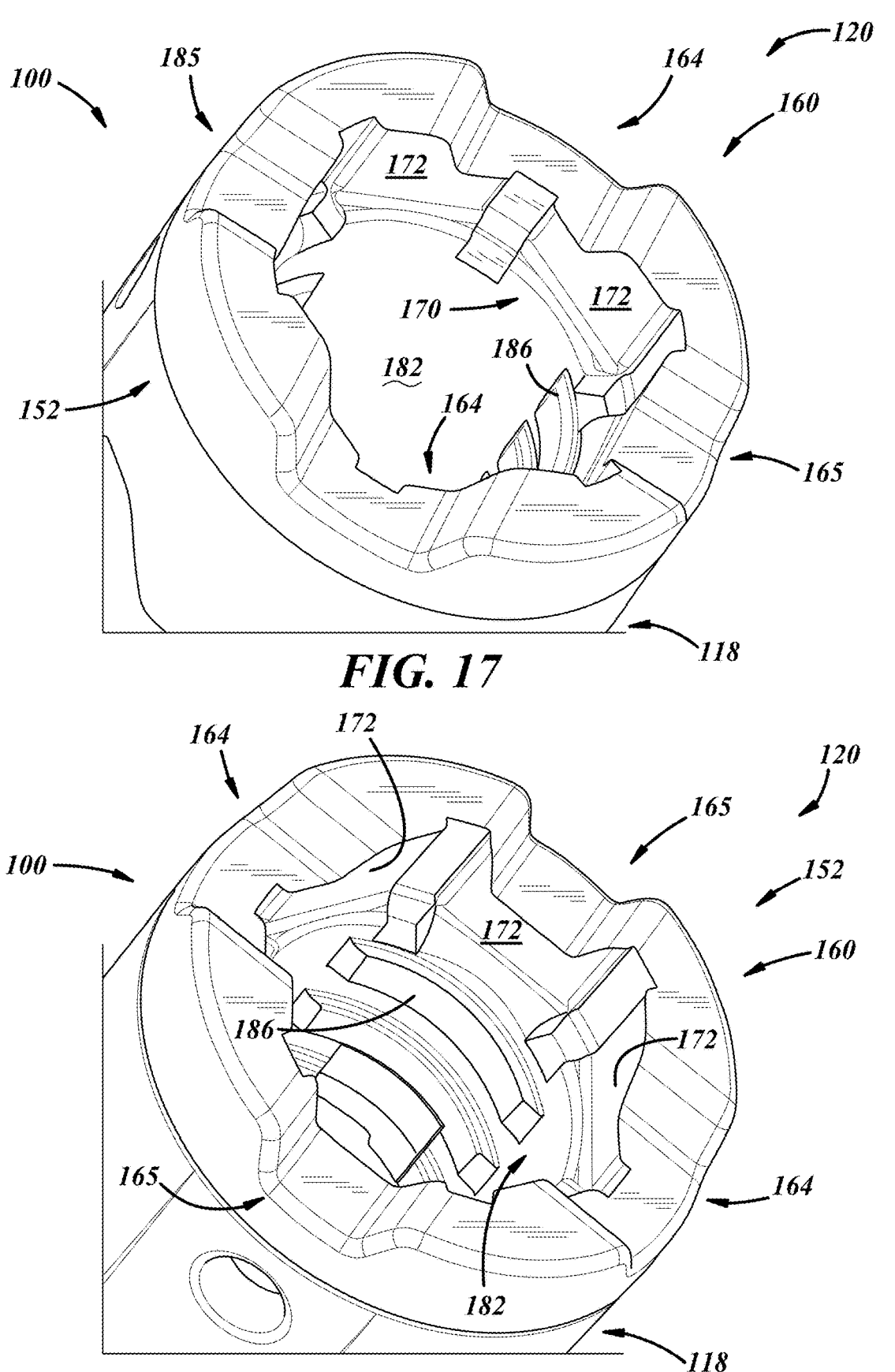
FIG. 17 is an enlarged perspective view of a lower portion of the handle of the paint roller of FIG. 1, illustrating a portion of the pole adapter.
FIG. 18 is another enlarged perspective view of a lower portion of the handle of the paint roller of FIG. 1, illustrating a portion of the pole adapter, and rotated ninety angular degrees from the view of FIG. 17.

With reference now to FIGS. 17 and 18, the plurality of circumferentially spaced and axially inwardly extending pockets 164, 165 of the outboard side 160 of the flange 152 constitute a first locking interface receiver configured for locked coupling to a first locking interface of a first pole (not shown), the circumferentially spaced receiver flats 172 of the radially inner portion 170 of the flange 152 constitutes a second locking interface receiver configured for locked coupling to a second locking interface of a second pole (not shown), and the one or more internal threads 186 of the radially inner portion 182 of the skirt are configured for threaded coupling to the one or more external threads of a third pole (not shown).

Figures 18A, 18B:
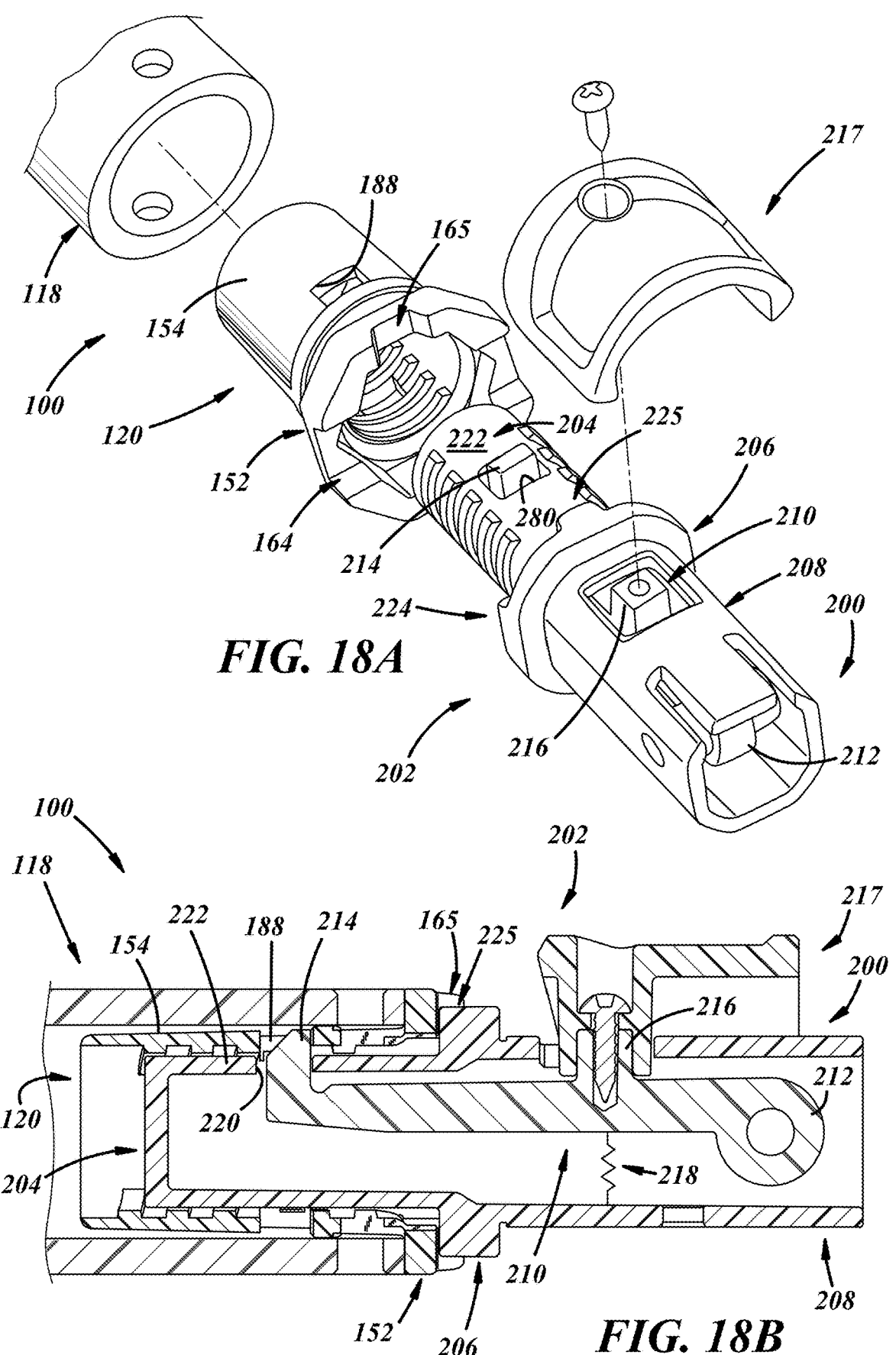
FIGS. 18A and 18B are perspective and sectional views of a first pole including a first locking interface configured to be coupled to the pole adapter.

With reference now to FIGS. 18A and 18B, a first pole 200 includes a first locking interface 202 including a barrel 204 corresponding to and configured to be inserted into the skirt 154 of the adapter 120, and a coupling flange 206 corresponding to and configured to be coupled to the flange 152 of the adapter 120. The first locking interface 202 further includes a pole portion 208 extending away from the coupling flange 206 on a side of the coupling flange 206 opposite that of the barrel 204 such that the coupling flange 206 is between the barrel 204 and the pole portion 208. The first locking interface 202 additionally includes a locking lever 210 including a fulcrum portion 212 at one end, a locking protrusion 214 at an opposite end, and a manual actuator portion 216 between the fulcrum portion 212 and the locking protrusion 214 and that may include a finger pad 217. The first locking interface 202 also includes a spring 218 (FIG. 18B) or other biasing member to bias the locking lever 210 toward a position where the locking protrusion 214 protrudes out through a passage 220 in a sidewall 222 of the barrel 204. The coupling flange 206 includes castellations or bosses 224, 225 corresponding to and configured to be carried in the corresponding pockets 164, 165 of the flange 152 of the adapter 120 to prevent relative rotation therebetween when the pole 200 is coupled to the adapter 120 specifically and the roller 100 generally. Also, when the pole 200 is inserted into the adapter 120, the lever 210 deflects or is deflected inwardly toward a longitudinal axis of the roller handle 118 so as to pivot about a pivot axis at the fulcrum portion 212 so that the locking protrusion 214 is displaced inwardly to permit axial insertion of the barrel 204 into the skirt 154 of the adapter 120. Once the corresponding flanges 152, 206 are mated together such that the bosses 224, 225 fit into the corresponding pockets 164, 165 to circumferentially retain the first pole 200 with respect to the adapter 120 specifically and the roller 100 generally, the bias force imposed by the spring 218 displaces the lever 210 such that the locking protrusion 214 is displaced outwardly to extend through the passage 220 of the barrel 204 and into or even through the corresponding reliefs 188 of the skirt 154 of the adapter 120 to axially retain the first pole 200 with respect to the adapter 120 specifically and the roller 100 generally.

Figures 18C, 18D:
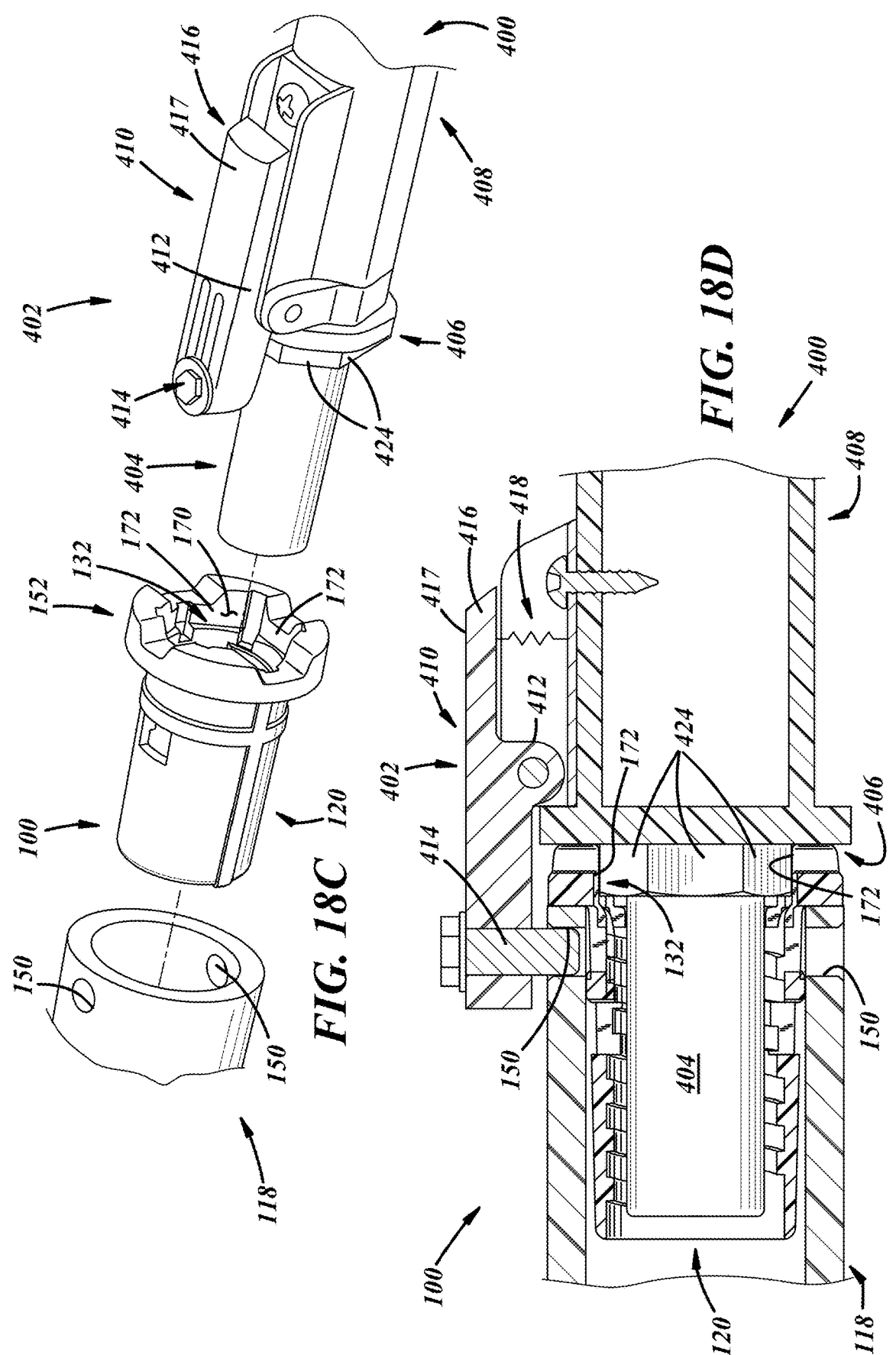
FIGS. 18C and 18D are perspective and sectional views of a second pole including a second locking interface configured to be coupled to the pole adapter.
Figure 18E:
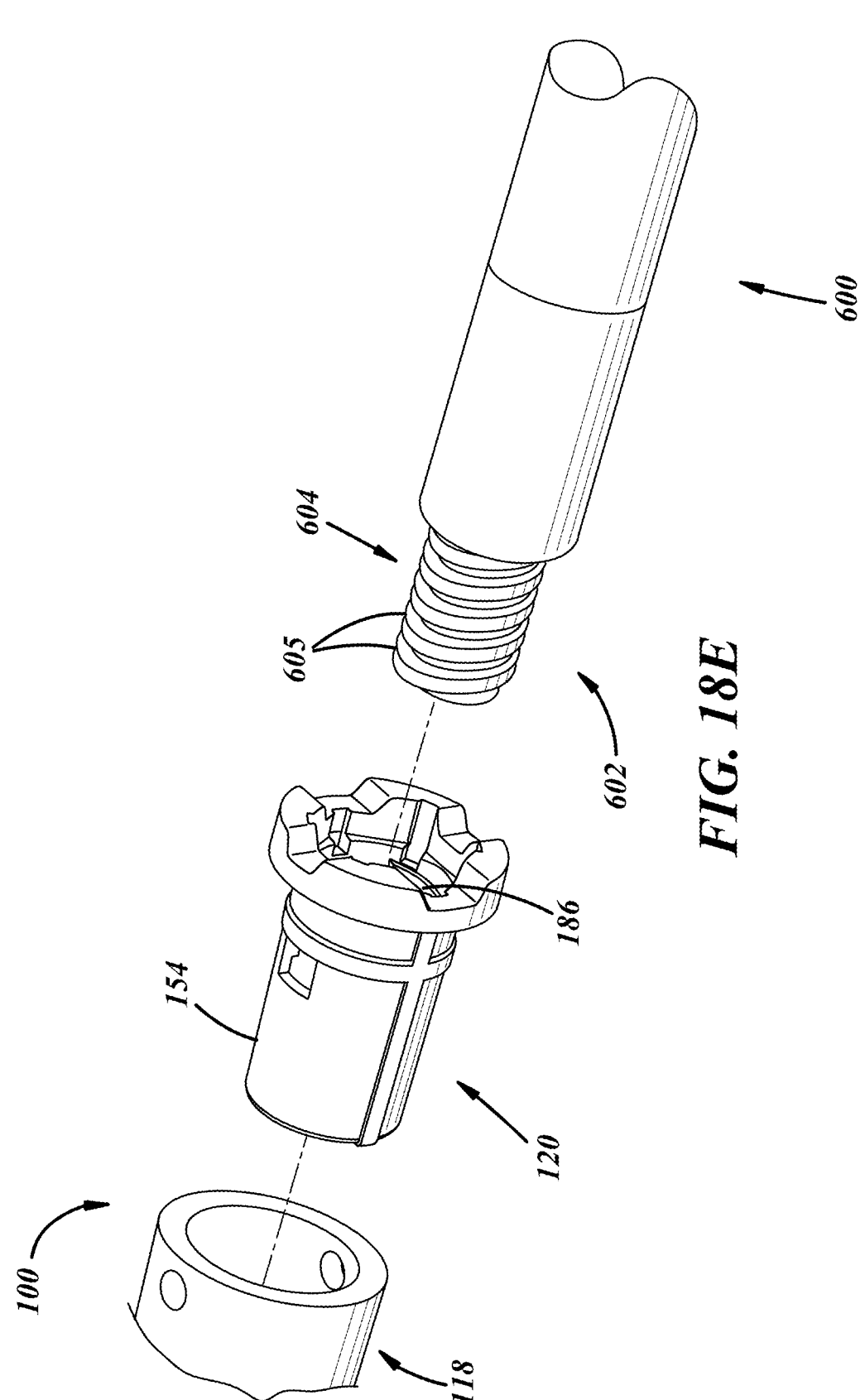
FIG. 18E is a perspective view of a third pole including a third locking interface configured to be coupled to the pole adapter.

With reference now to FIGS. 18C and 18D, a second pole 400 includes a second locking interface 402 including a barrel 404 corresponding to and configured to be inserted into the skirt 154 of the adapter 120, and a coupling flange 406 corresponding to and configured to be coupled to the flange 152 of the adapter 120. The second locking interface 402 further includes a pole portion 408 extending away from the coupling flange 406 on a side of the coupling flange 406 opposite that of the barrel 404 such that the coupling flange 406 is between the barrel 404 and the pole portion 408. The second locking interface 402 additionally includes a locking lever 410 including a manual actuator portion 416 at one end and that may include a finger pad 417, a locking protrusion 414 at an opposite end, and a fulcrum portion 412 between the manual actuator portion 416 and the locking protrusion 414. The second locking interface 402 also includes a spring 418 (FIG. 18D) or other biasing member to bias the locking lever 410 toward a position where the locking protrusion 414 protrudes radially inwardly into a corresponding one of the transverse reliefs 150 of the roller 100, in this embodiment, of the handle 118 of the roller 100. The coupling flange 406 includes flats 424 corresponding to and configured to be carried in the adapter pocket 132, more specifically, in the radially inner portion 170 (FIG. 18C) of the flange 152, and corresponding to and configured to be engaged with the corresponding receiver flats 172 of the flange 152 of the adapter 120 to prevent relative rotation therebetween when the pole 200 is coupled to the adapter 120. Also, when the pole 400 is inserted into the adapter 120, the lever 410 deflects or is deflected so as to pivot about a pivot axis at the fulcrum portion 412 so that the locking protrusion 414 is displaced outwardly with respect to a longitudinal axis of the roller handle 118 to permit axial insertion of the barrel 404 into the skirt 154 of the adapter 120. Once the corresponding flanges 152, 406 are mated together such that the flats 424 of the second locking interface 402 engage the corresponding flats 172 of the adapter 120 to circumferentially retain the second pole 400 with respect to the adapter 120 specifically and the roller 100 generally, the bias force imposed by the spring 418 displaces the lever 410 such that the locking protrusion 414 is displaced inwardly to extend into or even through the corresponding relief 150 of the roller 100 to axially retain the second pole 400 with respect to the adapter 120 specifically and the roller 100 generally.

FIG. 18C shows a third pole 600 including a third locking interface 602 including a barrel 604 corresponding to and configured to be inserted into the skirt 154 of the adapter 120. The barrel 604 includes one or more threads 605 corresponding to and threadable to the one or more threads 186 of the adapter 120 to axially retain the third pole 600 with respect to the adapter 120 specifically and the roller 100 generally.

Figure 19:
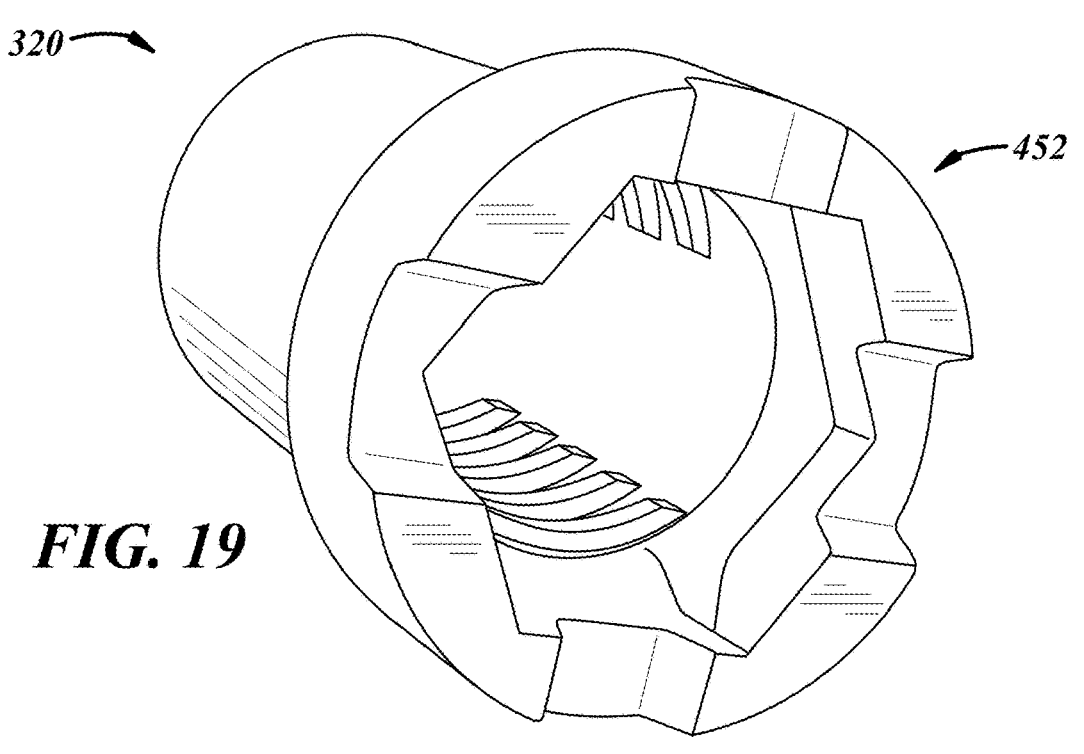
FIG. 19 is a perspective view of another illustrative embodiment of a pole adapter.
Figure 20:
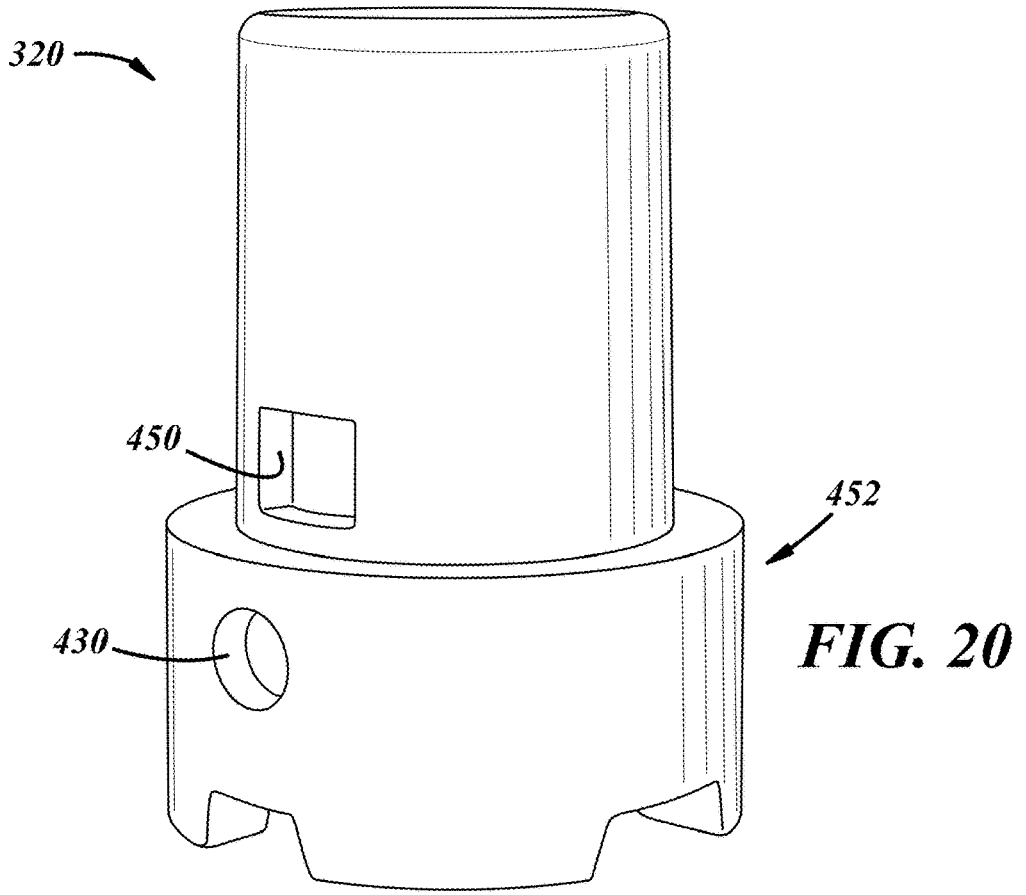
FIG. 20 is an elevational view of the pole adapter of FIG. 19.

FIGS. 19 and 20 illustrate another illustrative embodiment of a pole adapter 320. This embodiment is similar in many respects to the embodiment of FIGS. 1-18C and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

In this embodiment, the adapter 320 includes a flange 452 that is relatively longer than that of the embodiment of FIGS. 1-18C to accommodate one or more transverse reliefs 450 therethrough. This adapter 320 may be useful in cases where a tool handle does not already have such transverse reliefs. Otherwise, the adapter 320 may be substantially the same as the adapter 120 of FIGS. 1-18C.

Accompanying this specification are one or more design patent specification and drawing appendices, incorporated herein by reference in their entireties, for which one or more continuing applications may be filed.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A pole adapter extending along a longitudinal axis, and comprising:
  a flange including
    an inboard side including an adapter base surface,
    an outboard side having an outboard surface and a plurality of circumferentially spaced and axially inwardly extending pockets in the outboard surface and having obliquely oriented receiver facets,
    a radially inner portion extending axially between the outboard and inboard sides and having circumferentially spaced radially inwardly facing receiver flats, and
    a radially outer portion extending axially between the outboard and inboard sides; and
  a skirt extending axially away from the flange and including
    a radially outer portion extending away from the adapter base surface of the flange and having a radially outer surface, and
    a radially inner portion having a radially inner surface carrying one or more internal threads.

2. The pole adapter of claim 1, wherein the plurality of circumferentially spaced and axially inwardly extending pockets of the outboard side of the flange constitute a first locking interface receiver configured for locked coupling to a first locking interface of a first pole, the receiver flats of the radially inner portion of the flange constitutes a second locking interface receiver configured for locked coupling to a second locking interface of a second pole, and the one or more internal threads of the radially inner portion of the skirt are configured for threaded coupling to one or more external threads of a third pole.

3. The pole adapter of claim 2, wherein the skirt further includes one or more transverse reliefs configured to accept a locking member of the first pole.

4. The pole adapter of claim 2, wherein the flange further includes one or more transverse reliefs configured to accept a locking member of the second pole.

5. The pole adapter of claim 1, wherein a diametric distance between opposed instances of the radially inwardly facing receiver flats is greater than an inside diameter of the radially inner portion of the skirt.

6. The pole adapter of claim 1, wherein the skirt includes a plurality of transversely extending apertures at an intersection of the adapter base surface and the skirt.

7. The pole adapter of claim 1, wherein the radially outer portion of the skirt also includes axially extending ribs projecting radially outwardly from the radially outer surface.

8. The pole adapter of claim 7, wherein the axially extending ribs are tapered radially inwardly extending in a direction away from the adapter base surface.

9. The pole adapter of claim 7, wherein the radially outer portion of the skirt also includes a circumferentially extending rib projecting radially outwardly from the radially outer surface.

10. The pole adapter of claim 9, wherein the circumferentially extending rib is located proximate the adapter base surface.

11. The pole adapter of claim 1, wherein the flange includes one or more transverse reliefs extending therethrough configured to be coupled to a locking member of a pole.

12. A hand tool, comprising:
  a handle including a sidewall circumscribing the longitudinal axis, a frame end, and a free end axially oppositely disposed from the frame end and having a handle base wall with an outboard base surface and an adapter pocket in the handle base wall; and
  the pole adapter of claim 1 carried in the adapter pocket of the handle, wherein the adapter base surface of the flange locates against the handle base wall of the sidewall of the handle.

13. The hand tool of claim 12, wherein the sidewall of the handle includes at least one transverse relief therein configured to accept a locking member of a pole.

14. The hand tool of claim 13, wherein the frame end of the handle includes oppositely disposed flanges, and the at least one transverse relief includes multiple reliefs circumferentially aligned with the oppositely disposed flanges.

15. A pole adapter system, comprising:
  a first pole including a first locking interface including a first locking interface plug;
  a second pole including a second locking interface different from the first locking interface of the first pole and including a second locking interface plug;
  a third pole including one or more external threads; and an adapter including a first locking interface receiver configured for locked coupling to the first locking interface of the first pole, a second locking interface receiver configured for locked coupling to the second locking interface of the second pole, and one or more internal threads for threaded coupling to the one or more external threads of the third pole.

16. The pole adapter system of claim 15, wherein the first locking interface plug includes circumferentially spaced and axially outwardly projecting lugs having obliquely oriented flanks and the first locking interface receiver includes circumferentially spaced and axially inwardly extending pockets having obliquely oriented receiver flanks that engage the obliquely oriented flanks of the axially outwardly projecting lugs.

17. The pole adapter system of claim 15, wherein the second locking interface plug includes circumferentially spaced radially outwardly facing plug flats and the second locking interface receiver includes circumferentially spaced radially inwardly facing receiver flats that engage the radially outwardly facing plug flats.

18. The pole adapter system of claim 15, wherein the first locking interface has a radially outwardly projecting tooth and the adapter has a sidewall with a tooth passage to accept the radially outwardly projecting tooth therethrough.

19. The pole adapter system of claim 15, wherein the second locking interface has a radially inwardly projecting tooth and the adapter has a sidewall with a tooth passage to accept the radially inwardly projecting tooth therethrough.

20. The pole adapter system of claim 15, further comprising:

a fluent material roller including a handle having a wire end and a pole coupling end having an opening therein, wherein the adapter is carried in the opening of the pole coupling end of the handle of the fluent material roller.

21. The pole adapter system of claim 20, wherein the adapter is molded into the handle of the fluent material roller.

22. A hand tool, comprising:

a handle including a sidewall circumscribing a longitudinal axis, a frame end, and a free end axially oppositely disposed from the frame end and having a handle base wall with an outboard base surface and an adapter pocket in the handle base wall; and a pole adapter extending along the longitudinal axis and carried in the adapter pocket of the handle, and including a flange including an inboard side including an adapter base surface, an outboard side having an outboard surface and a plurality of circumferentially spaced and axially inwardly extending pockets in the outboard surface and having obliquely oriented receiver facets, a radially inner portion extending axially between the outboard and inboard sides and having circumferentially spaced radially inwardly facing receiver flats, and a radially outer portion extending axially between the outboard and inboard sides; and a skirt extending axially away from the flange and including a radially outer portion extending away from the adapter base surface of the flange and having a radially outer surface, and a radially inner portion having a radially inner surface carrying one or more internal threads.

* * * * *